United States Patent
Kato

(10) Patent No.: US 12,221,542 B2
(45) Date of Patent: Feb. 11, 2025

(54) ADDITION-CURABLE SILICONE RUBBER COMPOSITION AND METHOD FOR PRODUCING SAME

(71) Applicant: SHIN-ETSU CHEMICAL CO., LTD., Tokyo (JP)

(72) Inventor: Nobu Kato, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 828 days.

(21) Appl. No.: 17/415,360

(22) PCT Filed: Dec. 10, 2019

(86) PCT No.: PCT/JP2019/048224
§ 371 (c)(1),
(2) Date: Jun. 17, 2021

(87) PCT Pub. No.: WO2020/129744
PCT Pub. Date: Jun. 25, 2020

(65) Prior Publication Data
US 2022/0064446 A1 Mar. 3, 2022

(30) Foreign Application Priority Data
Dec. 18, 2018 (JP) ................. 2018-235957

(51) Int. Cl.
| | |
|---|---|
| *C08G 77/12* | (2006.01) |
| *C08G 77/08* | (2006.01) |
| *C08G 77/20* | (2006.01) |
| *C08L 5/16* | (2006.01) |
| *C08L 83/04* | (2006.01) |

(52) U.S. Cl.
CPC .............. *C08L 83/04* (2013.01); *C08G 77/08* (2013.01); *C08G 77/12* (2013.01); *C08G 77/20* (2013.01); *C08L 5/16* (2013.01); *C08L 2205/025* (2013.01); *C08L 2205/03* (2013.01)

(58) Field of Classification Search
CPC ...... C08L 83/04; C08L 5/16; C08L 2205/025; C08L 2205/03; C08L 83/14; C08G 77/08; C08G 77/12; C08G 77/20; C08G 83/007; C09D 183/04; C08B 37/0015
See application file for complete search history.

(56) References Cited

U.S. PATENT DOCUMENTS

| | | | |
|---|---|---|---|
| 2006/0009592 A1* | 1/2006 | Ochs | C08G 77/38 428/447 |
| 2008/0200609 A1 | 8/2008 | Woerner et al. | |
| 2008/0287573 A1 | 11/2008 | Rhee et al. | |

FOREIGN PATENT DOCUMENTS

| | | |
|---|---|---|
| CN | 102716104 A | 10/2012 |
| CN | 107189156 A | 9/2017 |
| CN | 108504102 A | 9/2018 |
| EP | 0 583 159 A2 | 2/1994 |
| JP | 6-93186 A | 4/1994 |
| JP | 6-157912 A | 6/1994 |
| JP | 2000-230078 A | 8/2000 |
| JP | 2003226352 A * | 8/2003 |
| JP | 2007-513514 A | 5/2007 |
| JP | 2008-195939 A | 8/2008 |
| JP | 2009-185254 A | 8/2009 |
| JP | 2012-25923 A | 2/2012 |
| JP | 2015-134881 A | 7/2015 |
| WO | WO 2015/106929 A1 | 7/2015 |

OTHER PUBLICATIONS

International Search Report (PCT/ISA/210) issued in PCT/JP2019/048224 mailed on Feb. 18, 2020.
Written Opinion (PCT/ISA/237) issued in PCT/JP2019/048224 mailed on Feb. 18, 2020.

* cited by examiner

Primary Examiner — Kumar R Bhushan
(74) Attorney, Agent, or Firm — Birch, Stewart, Kolasch & Birch, LLP

(57) ABSTRACT

An addition-curable silicone rubber composition which contains: 100 parts by mass of (A) an organopolysiloxane that has at least two alkenyl groups, each of which is bonded to a silicon atom, in each molecule, and wherein an alkenyl group is bonded to a silicon atom at one end or both ends of the molecular chain; 1-80 parts by mass of (B) γ-cyclodextrin; (C) an organohydrogen polysiloxane that has at least two hydrogen atoms, each of which is bonded to a silicon atom, in each molecule in such an amount that the molar ratio of the hydrogen atoms bonded to silicon atoms (Si—H groups) to the total amount of the alkenyl groups bonded to silicon atoms in the entire composition, namely (Si—H groups)/(Si-alkenyl groups) is from 0.5 to 5.0; and a catalytic amount of (D) an addition reaction catalyst.

8 Claims, No Drawings

ADDITION-CURABLE SILICONE RUBBER COMPOSITION AND METHOD FOR PRODUCING SAME

TECHNICAL FIELD

The present invention relates to an addition-curable silicone rubber composition and to a method for producing the same.

BACKGROUND ART

Silicone rubber, owing to its heat resistance, cold resistance, safety, good appearance (transparency), agreeable texture as well as good durability, is used in a wide range of fields, including health care materials such as for baby bottle nipples and food products, hose and gasket materials for vehicles, building components and textile coating materials.

Silicone rubber generally has a high coefficient of friction, which sometimes makes slideability a problem. To resolve this problem, methods have been described in which a silicone oil having phenyl groups and lacking reactive substituents is added to a silicone rubber composition so that lubricant bleeds to the rubber surface after curing (Patent Nos. 1 and 2). However, in such cases, the surface of the cured product is covered with an oil film of the lubricant, sometimes resulting in lubricant contamination of the exterior and giving the product an unpleasant feel when touched with bare hands. It has also been disclosed that, with the addition of a high-viscosity polyorganosiloxane having no alkenyl groups, the coefficient of friction of the silicone rubber obtained by curing such a silicone rubber composition decreases (Patent Document 3). Although the formation of an oil film can be suppressed in this way, lowering the coefficient of friction to a sufficient degree is difficult in the case of rubber having a low hardness.

PRIOR ART DOCUMENTS

Patent Documents

Patent Document 1: JP-A H06-93186
Patent Document 2: JP-A 2009-185254
Patent Document 3: JP-A 2008-195939

SUMMARY OF INVENTION

Technical Problem

This invention was arrived at in order to improve the above situation. An object of the invention is to provide an addition-curable silicone rubber composition that is able to give a low friction coefficient silicone rubber without relying on the rubber hardness. Another object of the invention is to provide a method for producing such a composition.

Solution to Problem

The inventor has conducted extensive investigations in order to achieve these objects and discovered as a result that by combining an organopolysiloxane having silicon-bonded alkenyl groups at one or both ends of the molecular chain with γ-cyclodextrin, the γ-cyclodextrin encloses the organopolysiloxane, thereby making it possible to obtain an addition-curable silicone rubber composition that can provide a low friction coefficient silicone rubber without relying on the rubber hardness. This discovery ultimately led to the present invention.

Accordingly, the following inventions are provided herein.

1. An addition-curable silicone rubber composition that includes:
   (A) 100 parts by weight of an organopolysiloxane which has at least two silicon-bonded alkenyl groups per molecule and in which an alkenyl group is bonded to a silicon atom at one or both ends of the molecular chain:
   (B) from 1 to 80 parts by weight of γ-cyclodextrin;
   (C) an organohydrogenpolysiloxane having at least two silicon-bonded hydrogen atoms per molecule, in an amount such that the molar ratio of the silicon-bonded hydrogen atoms (Si—H groups) to all silicon-bonded alkenyl groups in the overall composition, expressed as (Si—H groups/Si-alkenyl groups), is from 0.5 to 5.0; and
   (D) a catalytic amount of an addition reaction catalyst.
2. The addition-curable silicone rubber composition of 1 above, wherein some or all of component (A) forms, together with component (B), an inclusion complex.
3. The addition-curable silicone rubber composition of 1 or 2 above, wherein component (A) is an organopolysiloxane in which the alkenyl groups are bonded only to silicon atoms at one or both ends of the molecular chain, and substituents bonded to silicon atoms other than at both ends of the molecular chain are all methyl groups.
4. The addition-curable silicone rubber composition of 1 or 2 above, wherein component (A) is an organopolysiloxane in which one end or both ends of the molecular chain are capped with dimethylalkenylsiloxy groups.
5. The addition-curable silicone rubber composition of any of 1 to 4 above, wherein component (A) is a linear organopolysiloxane.
6. The addition-curable silicone rubber composition of any of 1 to 5 above, wherein component (A) is an organopolysiloxane having a viscosity at 25° C., as measured by the method in JIS K 7117-1: 1999, of from 5,000 to 200,000 mPa·s.
7. A method for producing the addition-curable silicone rubber composition of 2 above, which method includes the steps of;
   (1) forming an inclusion complex of components (A) and (B) by mixing together component (B) and water and then adding and mixing component (A) into the resulting mixture:
   (2) adding and mixing component (C) into the inclusion complex; and
   (3) further adding and mixing in component (D).

Advantageous Effects of Invention

This invention makes it possible to provide addition-curable silicone rubber compositions which, by combining specific amounts of above components (A) to (D), are able to give silicone rubbers that have a low friction coefficient without forming an oil film on the rubber surface and without relying on the rubber hardness.

DESCRIPTION OF EMBODIMENTS

The invention is described in detail below.
[Component (A)]
Component (A) is an organopolysiloxane which has at least two silicon-bonded alkenyl groups per molecule and in which an alkenyl group is bonded to a silicon atom at one or both ends of the molecular chain. Component (A) is the base polymer of the addition-curable silicone rubber composition of the invention (sometimes referred to below as the "composition"). There are at least two silicon-bonded alkenyl groups per molecule.

An organopolysiloxane that has average compositional formula (I) below and is liquid at 25° C. may be used as component (A).

$$R^1_a SiO_{(4-a)/2} \quad (I)$$

In the formula, each $R^1$ is independently a like or unlike, substituted or unsubstituted monovalent hydrocarbon group of 1 to 10 carbon atoms, with at least two occurrences of $R^1$ being alkenyl groups, and an alkenyl group is bonded to a silicon atom at one or both ends of the molecular chain. The subscript 'a' is a positive number in the range of 1.5 to 2.8, preferably 1.8 to 2.5, and more preferably 1.95 to 2.05.

The silicon-bonded, substituted or unsubstituted monovalent hydrocarbon group of 1 to 10 carbon atoms, preferably 1 to 8 carbon atoms, represented above as $R^1$ is exemplified by alkyl groups such as methyl, ethyl, propyl, isopropyl, butyl, isobutyl, tert-butyl, pentyl, neopentyl, hexyl, cyclohexyl, octyl, nonyl and decyl groups; aryl groups such as phenyl, tolyl, xylyl and naphthyl groups; aralkyl groups such as benzyl, phenylethyl and phenylpropyl groups; alkenyl groups such as vinyl, allyl, butenyl, hexenyl, cyclohexenyl and octenyl groups; and any of these groups in which some or all hydrogen atoms are substituted with fluorine, bromine, chlorine or other halogen atoms, cyano groups and the like, examples of which include chloromethyl, chloropropyl, bromoethyl, trifluoropropyl and cyanoethyl groups. It is preferable for at least 90 mol % of all occurrences of $R^1$ to be methyl groups, and more preferable for all such occurrences other than those at the ends of the molecular chain to be methyl groups.

At least two occurrences of $R^1$ are alkenyl groups. The alkenyl groups are preferably ones with 2 to 8 carbon atoms, more preferably ones with 2 to 6 carbon atoms, and still more preferably vinyl groups. The content of alkenyl groups in the organopolysiloxane (A) is preferably from $1.0 \times 10^{-6}$ mol/g to $3.0 \times 10^{-3}$ mol/g, and more preferably from $1.0 \times 10^{-5}$ mol/g to $2.0 \times 10^{-3}$ mol/g. At an alkenyl group content in this range, the hardness is in a more suitable range, enabling a cured product of excellent rubber properties to be obtained.

In component (A) of the invention, an alkenyl group is bonded to a silicon atom at one or both ends of the molecular chain. That is, a silicon atom at the end of the molecular chain (i.e., the silicon atom in a triorganosiloxy group) has an alkenyl group thereon. When component (A) has an alkenyl group on a silicon atom at the end of the molecular chain, after an inclusion complex with the subsequently described component (B) has been formed, the end can be capped by a hydrosilylation addition reaction (crosslinking reaction) with subsequently described component (C), which can prevent component (B) from leaving component (A). Also, there may or may not be alkenyl groups bonded to silicon atoms partway along the molecular chain (that is, silicon atoms on diorganosiloxane units or monoorganosilsesquioxane units), although the absence of such alkenyl groups more readily promotes the formation of an inclusion complex with subsequently described component (B). Of these, the organopolysiloxane is one in which an alkenyl group is bonded to a silicon atom at one or both ends of the molecular chain, preferably one in which alkenyl groups are bonded to silicon atoms at both ends of the molecular chain (diorganoalkenylsiloxy-capped), and in which substituents (side chains) bonded to silicon atoms other than at both ends of the molecular chain are all methyl groups.

Also, the organopolysiloxane is preferably one in which one end or both ends of the molecular chain are capped with dimethylalkenylsiloxy groups.

This organopolysiloxane has a structure which is preferably linear. Specifically, a linear structure in which both ends of the molecular chain are capped with triorganosiloxy groups (an alkenyl group being bonded to a silicon atom at one or both ends of the molecular chain) and the backbone is a straight chain composed of repeating diorganosiloxane units is preferred, although a branched structure or cyclic structure having monoorganosilsesquioxane units in places is also acceptable.

The organopolysiloxane serving as component (A) is exemplified by diorganopolysiloxanes capped at both ends of the molecular chain with diorganoalkenylsiloxy groups, diorganosiloxane/organoalkenylsiloxane copolymers capped at both ends of the molecular chain with diorganoalkenylsiloxy groups, and diorganosiloxane/organoalkenylsiloxane copolymers capped at one end of the molecular chain with a diorganoalkenylsiloxy group and capped at the other end with a triorganosiloxy group. Of these, diorganopolysiloxanes capped at both ends of the molecular chain with diorganoalkenylsiloxy groups and diorganosiloxane/organoalkenylsiloxane copolymers capped at both ends of the molecular chain with diorganoalkenylsiloxy groups are preferred. Dimethylpolysiloxanes capped at both ends of the molecular chain with alkenyldimethylsiloxy groups are more preferred. In the above siloxanes, "organo group" refers to a group which, excluding alkenyl groups, is the same as the substituted or unsubstituted monovalent hydrocarbon groups of $R^1$ in formula (I).

The average degree of polymerization of the organopolysiloxane (A) is preferably not more than 2,000, more preferably from 100 to 1,500, and even more preferably from 200 to 1,500. Within this range, an inclusion complex with subsequently described component (B) readily forms and a paste-like inclusion complex can be obtained.

In this invention, "average degree of polymerization" refers to the number-average degree of polymerization, which shall be understand to mean the average degree of polymerization obtained by gel permeation chromatography (GPC) under the conditions indicated below using polystyrene as the standard substance.

[Measurement Conditions]
 Developing solvent: toluene
 Flow rate: 1 mL/min
 Detector: differential refractive index detector (RI)
 Columns: KF-805LX2 (Shodex)
 Column temperature: 25° C.
 Sample injection rate: 30 μL (toluene solution having a concentration of 0.2 wt %)

The organopolysiloxane (A) has a viscosity at 25° C. of preferably from 5,000 to 200,000 mPa·s, and more preferably from 5,000 to 150,000 mPa·s. Within this viscosity range, the formation of an inclusion complex with component (B) readily proceeds. Also, in this invention, the viscosity refers to the viscosity at 25° C., as measured by the method in JIS K 7117-1: 1999, and is a value obtained with a BH-type rotational viscometer.

[Component (B)]

Component (B) is γ-cyclodextrin. γ-Cyclodextrin is a compound in which eight D-glucose units are joined by α-1,4-glycosidic bonds to form a cyclic structure. This γ-cyclodextrin has a hydrophilic environment outside the ring and a hydrophobic environment inside the ring; through hydrophobic interactions with water as the medium, it is able to take an organic molecule into the ring and form an inclusion complex. Component (B) in the inventive composition forms an inclusion complex by taking some or all of component (A) into the rings of component (B), and is an ingredient used to change the properties of the cured rubber (lower the friction coefficient, increase the solvent resistance) by altering the surface state of component (A).

The amount of component (B) included per 100 parts by weight of component (A) is from 1 to 80 parts by weight, preferably from 5 to 80 parts by weight, and more preferably from 10 to 80 parts by weight. Within this range, an inclusion complex with component (A) forms more easily, and the friction coefficient-lowering and solvent resistance-increasing effects on the cured rubber can be better exhibited.

In this invention, there are cases in which some or all of component (A) and component (B) form an inclusion complex; the formation of this inclusion complex can be confirmed from the appearance. Some of component (B) may be used to form the inclusion complex, or all of it may be used. Specifically, when the formation of an inclusion complex of component (A) and component (B) proceeds, all of the mixture of components (A) and (B) becomes a uniform and opaque white paste; moreover, the uncombined component (B) that existed as granules diminishes and the granules disappear. The granules can be closely checked by measuring the degree of dispersion using the grindometer mentioned in JIS K 5600-5-1999. In this invention, the degree of dispersion when an inclusion complex has been formed, as measured with a grindometer (0 to 100 μm gauge), is ≥40 μm, preferably ≥20 μm, and more preferably at the limit of detection of ≥0 sm.

The method of forming an inclusion complex of components (A) and (B) is described in detail below in the section on the method for producing the composition.

[Component (C)]

Component (C) is an organohydrogenpolysiloxane having at least two silicon-bonded hydrogen atoms per molecule. One such compound may be used alone or two or more may be used in suitable combination. Component (C) serves as a curing agent for curing the composition via hydrosilylation addition reactions between Si—H groups on the molecule and alkenyl groups in component (A) that form crosslinkages.

The organohydrogenpolysiloxane of component (C) is represented by the average compositional formula (II) below. Suitable use can be made of one having at least 2, preferably at least 3, more preferably from 3 to 100, and even more preferably from 3 to 80, silicon-bonded hydrogen atoms (Si—H groups) per molecule $$R^2{}_bH_cSiO_{(4-b-c)/2} \tag{II}$$

(wherein each $R^2$ is a like or unlike, substituted or unsubstituted monovalent hydrocarbon group of 1 to 10 carbon atoms, b is a positive number from 0.7 to 2.1, c is a positive number from 0.001 to 1.0, and b+c is a positive number from 0.8 to 3.0).

In formula (II), each $R^2$ is independently a like or unlike, substituted or unsubstituted monovalent hydrocarbon group of 1 to 10 carbon atoms, preferably 1 to 8 carbon atoms. Examples of $R^2$ include alkyl groups such as methyl, ethyl, propyl, isopropyl, butyl, isobutyl, tert-butyl, pentyl, neopentyl, hexyl, cyclohexyl, octyl, nonyl and decyl groups; aryl groups such as phenyl, tolyl and naphthyl groups; and any of these groups in which some or all hydrogen atoms are substituted with fluorine, bromine, chlorine or other halogen atoms, cyano groups and the like, such as chloromethyl, chloropropyl, bromoethyl, trifluoropropyl and cyanoethyl groups. Component (C) preferably has no aliphatic unsaturated groups.

The letter 'b' is a positive number from 0.7 to 2.1, preferably from 0.8 to 2.0; the letter 'c' is a positive number from 0.001 to 1.0, preferably from 0.01 to 1.0; and the sum 'b+c' is a positive number from 0.8 to 3.0, preferably from 1.0 to 2.5. The molecular structure of the organohydrogenpolysiloxane (B) may be a linear, cyclic, branched or three-dimensional network structure. The hydrogen atoms that bond to silicon atoms may be positioned at the ends of the molecular chain or partway along the molecular chain, or may be positioned in both places.

Specific examples of such organohydrogenpolysiloxanes serving as component (C) include methylhydrogencyclopolysiloxane, methylhydrogensiloxane/dimethylsiloxane cyclic copolymers, methylhydrogenpolysiloxanes capped at both ends with trimethylsiloxy groups, dimethylsiloxane/methylhydrogensiloxane copolymers capped at both ends with trimethylsiloxy groups, dimethylpolysiloxanes capped at both ends with dimethylhydrogensiloxy groups, dimethylsiloxane/methylhydrogensiloxane copolymers capped at both ends with dimethylhydrogensiloxy groups, copolymers consisting of $(CH_3)_2HSiO_{1/2}$ units, $(CH_3)_3SiO_{1/2}$ units and $SiO_{4/2}$ units, copolymers consisting of $(CH_3)_2HSiO_{1/2}$ units and $SiO_{4/2}$ units, and organohydrogenpolysiloxanes in which some or all methyl groups in these example compounds are substituted with other alkyl groups.

The content of silicon-bonded hydrogen atoms (Si—H groups) in the organohydrogenpolysiloxane (C) is preferably from $5.0\times10^{-4}$ to $1.7\times10^{-2}$ mol/g, and more preferably from $1.0\times10^{-3}$ to $1.7\times10^{-2}$ mol/g. Within this range, a cured rubber product having stable properties can be obtained.

The content of organohydrogenpolysiloxane serving as component (C) per 100 parts by weight of components (A) and (B) combined is preferably from 0.05 to 40 parts by weight, and more preferably from 0.1 to 20 parts by weight. This is an amount such that the molar ratio of silicon-bonded hydrogen atoms (Si—H groups) in the organohydrogenpolysiloxane serving as component (C) to the total amount of silicon-bonded alkenyl groups in the overall composition, expressed as (Si—H groups/Si-alkenyl groups), is from 0.5 to 5.0, and preferably from 0.8 to 3.0. By setting the content in this range, crosslinking of the composition is possible. When component (A) is the only component having silicon-bonded alkenyl groups, the above ratio becomes the molar ratio (Si—H groups/Si-alkenyl groups) of silicon-bonded hydrogen atoms (Si—H groups) in the organohydrogenpolysiloxane serving as component (C) to the total amount of silicon-bonded alkenyl groups in component (A).

[Component (D)]

The addition reaction catalyst serving as component (D) may be used singly or two or more may be used in suitable combination. This is exemplified by platinum metal-based addition reaction catalysts. Specific examples include platinum catalysts such as platinum black, platinic chloride, chloroplatinic acid, reaction products of chloroplatinic acid and monohydric alcohols, complexes of chloroplatinic acid and olefins, and platinum bis(acetoacetate), and also palladium catalysts and rhodium catalysts.

The addition reaction catalyst is included in a catalytic amount. Expressed in terms of the weight of the platinum metal element with respect to component (A), this is preferably from 0.01 to 1,000 ppm, more preferably from 0.1 to 1,000 ppm, and still more preferably from 1 to 500 ppm.

[Optional Ingredients]

In addition to components (A) to (D), the addition-curable silicone rubber composition of the invention may also include other ingredients, insofar as doing so does not detract from the advantageous effects of the invention. Specific examples include those mentioned below. These other ingredients may be of one type used alone or two or more may be used in suitable combination.

[Component (E)]

Component (E) of the invention is an organopolysiloxane having no alkenyl groups bonded to silicon atoms at one or both ends of the molecular chain. The organopolysiloxane of component (E) is exemplified by organopolysiloxanes of average compositional formula (III) below which are liquid at 25° C.

$(R^1_3SiO_{1/2})_2(R^4_2SiO_{2/2})_d$ (III)

(wherein each $R^3$ is a like or unlike, substituted or unsubstituted monovalent hydrocarbon group of 1 to 10 carbon atoms; each $R^4$ is a like or unlike, substituted or unsubstituted monovalent hydrocarbon group of 1 to 10 carbon atoms; and d is a positive number of from 1 to 1,500, preferably from 10 to 1,100, and more preferably from 10 to 800).

In formula (III), each $R^3$ is independently a like or unlike, substituted or unsubstituted monovalent hydrocarbon group of 1 to 10 carbon atoms, preferably 1 to 8 carbon atoms, and is exemplified in the same way as $R^2$ above.

Each $R^4$ is a like or unlike, substituted or unsubstituted monovalent hydrocarbon group of 1 to 10 carbon atoms, preferably 1 to 8 carbon atoms. Examples of $R^4$ include alkyl groups such as methyl, ethyl, propyl, isopropyl, butyl, isobutyl, tert-butyl, pentyl, neopentyl, hexyl, cyclohexyl, octyl, nonyl and decyl groups; aryl groups such as phenyl, tolyl, xylyl and naphthyl groups; aralkyl groups such as benzyl, phenylethyl and phenylpropyl groups; alkenyl groups such as vinyl, allyl, butenyl, hexenyl, cyclohexenyl and octenyl groups; and any of these groups in which some or all hydrogen atoms are substituted with fluorine, bromine, chlorine or other halogen atoms, cyano groups and the like, such as chloromethyl, chloropropyl, bromoethyl, trifluoropropyl and cyanoethyl groups.

Component (E) is differentiated from the organopolysiloxane of component (A) in that it has no alkenyl groups bonded to silicon atoms at one or both ends of the molecular chain. $R^4$ may or may not have alkenyl groups (ones having 2 to 8 carbon atoms are preferred, ones having 2 to 6 carbon atoms are more preferred, and vinyl groups are even more preferred). When $R^4$ has alkenyl groups, the alkenyl group content in component (E) is preferably from 0.00005 to 0.012 mol/g, and more preferably from 0.00009 to 0.012 mol/g. The average degree of polymerization is preferably not more than 1,500, and more preferably from 10 to 1,100.

The organopolysiloxane of component (E) is exemplified by diorganosiloxane/organoalkenylsiloxane copolymers capped at both ends of the molecular chain with triorganosiloxy groups. As used herein, "organo group" in the above siloxanes refers to a group which, excluding alkenyl groups, is the same as the substituted or unsubstituted monovalent hydrocarbon groups of $R^3$ in formula (III).

The organopolysiloxane (E) has a viscosity at 25° C. which is preferably from 2 to 200,000 mPa·s, and more preferably from 10 to 100,000 mPa·s.

Component (E) is an optional ingredient that may be included if desired. When it is included, the content thereof per 100 parts by weight of component (A) is from 0.1 to 30 parts by weight, and preferably from 0.5 to 20 parts by weight. For the composition as a whole, the molar ratio of silicon-bonded hydrogen atoms (Si—H groups) in the organohydrogenpolysiloxane serving as component (C) to the overall amount of silicon-bonded alkenyl groups in components (A) and (E), expressed as (Si—H groups/ alkenyl groups), is preferably from 0.5 to 5.0, and more preferably from 0.8 to 3.0. By setting the ratio within this range, crosslinking of the composition becomes possible.

Other ingredients that may be added where desired include, for example, fillers such as dry silica, precipitated silica, quartz powder, diatomaceous earth and calcium carbonate; electrically conductive agents such as carbon black, conductive zinc white and metal powder; vinyl group-containing cyclic siloxane compounds such as 1,3,5,7-tetramethyl-1,3,5,7-tetravinylcyclotetrasiloxane; hydrosilylation reaction regulators such as nitrogen-containing compounds, acetylene compounds, phosphorus compounds, nitrile compounds, carboxylates, tin compounds, mercury compounds and sulfur compounds; heat stabilizers such as iron oxide and cerium oxide, internal mold release agents such as dimethyl silicone oils; tackifiers; and thixotropic agents. The amounts thereof may be suitable amounts selected within ranges that do not detract from the advantageous effects of the invention.

[Production Method]

The method for producing the inventive composition is exemplified by a method such as the following.

An addition-curable silicone rubber composition can be prepared by adding components (A) to (D), adding also component (E) and other optional ingredients where desired, and uniformly mixing the ingredients in a stirrer or the like.

In particular, when an inclusion complex of components (A) and (B) is to be formed, the method of production is exemplified by a method that includes steps (1) to (3) below:

(1) forming an inclusion complex of components (A) and (B) by mixing together component (B) and water and then adding and mixing component (A) into the resulting mixture;

(2) adding and mixing component (C) into the inclusion complex that has been formed; and (3) further adding and mixing in component (D).

(1) The Step of Forming an Inclusion Complex of Components (A) and (B) by Mixing Together Component (B) and Water and then Adding and Mixing Component (A) into the Resulting Mixture:

First, water is added to component (B). Although the amount of water is not particularly limited, from 20 to 100 parts by weight of water may be added to 100 parts by weight of component (B) to form a paste, or from 300 to 600 parts by weight of water may be added to 100 parts by weight of component (B) to form a saturated aqueous solution or a suspension. The paste forming method is advantageous in that the amount of water used can be minimized, enabling the subsequent drying step to be simplified.

When a paste has been formed, component (A) is added to the paste and the ingredients are kneaded in a mortar or a mixing apparatus such as planetary mixer at between 20° C. and 100° C. for a period of from several minutes to several hours, and preferably from 1 minute to 1 hour.

When a saturated aqueous solution or a suspension has been formed, component (A) is added to the saturated aqueous solution or suspension and agitation is carried out at between 20° C. and 80° C. with a homogenizer or the like for a period of from several minutes to several days, preferably from 10 minutes to 72 hours.

Following Step (1), a water removing step may be included if necessary. An example of such a step is the method of distilling off water at room temperature or under applied heat and under reduced pressure.

(2) The Step of Adding and Mixing Component (C) into the Inclusion Complex that has been Formed:

The mixing time and temperature are not particularly limited. For example, mixing may be carried out at between 0° C. and 80° C. for a period of from 5 minutes to 120 minutes. When a reaction regulator is used, it is added in this step.

(3) The Step of Further Adding and Mixing in Component (D):

The mixing time and temperature are not particularly limited. For example, mixing may be carried out at between 0° C. and 80° C. for a period of from 1 second to 30 minutes.

[Molding/Curing Method]

A conventional process may be used as the method of molding/curing the addition-curable silicone rubber composition. The optimal molding means for the purpose may be selected from among, for example, injection molding, transfer molding, reaction injection molding and compression molding. The curing conditions employed may be hot curing (primary vulcanization) conditions of between 40° C. and 230° C. for a period of from about 3 seconds to about 160 minutes. Also, where necessary, secondary vulcanization (post-curing) at between 40° C. and 230° C. for a period of from about 10 minutes to about 24 hours may be optionally carried out.

[Cured Product]

The cured product obtained by press-curing the inventive composition at 120° C. for 10 minutes and subsequently carrying out a 150° C./1 hour post-cure within an oven has a hardness, as measured with a type A durometer based on JIS K 6253-3: 2012, of preferably from 10 to 90, and more preferably from 20 to 80.

The dynamic coefficient of friction ($\mu'$) measured under the following conditions is preferably from 0.01 to 0.60, and more preferably from 0.01 to 0.40.

[Dynamic Coefficient of Friction Measurement Conditions]

Measurement method: horizontal linear reciprocating sliding movement method

Contact: Steel ball

Load: 100 g

Velocity: 10 mm/s

The addition-curable silicone rubber composition of the invention gives a silicone rubber which, after curing, has high surface slippage without an oil film and has an excellent solvent resistance, and so can be suitably used in applications requiring slideability and in applications that come into contact with solvents.

EXAMPLES

The invention is illustrated more fully below by way of Examples and Comparative Examples, although the invention is not limited by these Examples. In the Examples below, "parts" stands for parts by weight. Also, "average degree of polymerization" refers to the number-average degree of polymerization.

Example 11

γ-Cyclodextrin (291 parts), 100 parts of water and 600 parts of dimethylpolysiloxane capped at both ends with dimethylvinylsiloxy groups and having an average degree of polymerization of 750 (A-1; viscosity, 30,000 mPa·s; alkenyl group content, 0.000038 mol/g) were mixed together at 25° C. for 20 minutes using a planetary mixer, following which the temperature was raised to 80° C. and the mixture was stirred for 20 minutes. Next, water was distilled off for 3 hours at 100° C. and under reduced pressure (1,200 Pa), giving an inclusion complex (IC-1) that was a uniform white paste. This inclusion complex (IC-1) had a degree of dispersion, as measured based on JIS K 5600-2-5: 1999 and using the PI-901 Grind Meter (measurement range, 0 to 100 μm) from Tester Sangyo Co., Ltd., of ≤0 μm.

A silicone rubber mixture was obtained by adding 0.88 part of methyl hydrogen/dimethylpolysiloxane capped at both ends with trimethylsiloxy groups and having an average of 35 Si—H groups on side chains (C-1; average degree of polymerization, 100; Si—H group content, 0.0055 mol/g) as a crosslinking agent and 0.10 part of 1,3,5,7-tetramethyl-1,3,5,7-tetravinylcyclotetrasiloxane as a reaction regulator to 100 parts of this inclusion complex (IC-1) and continuing to stir for 15 minutes.

The molar ratio of the total amount of Si—H groups to the amount of Si-vinyl groups (Si—H groups/vinyl groups) in this mixture was 1.3.

Next, 0.10 part of a dimethylsiloxane solution of 1,3-divinyl-1,1,3,3-tetramethyldisiloxane platinum complex (Pt concentration, 1 wt %) was mixed as component (D) into this silicone rubber mixture, giving a silicone rubber composition. The composition was press-cured at 120° C. for 10 minutes and then subjected to a 150° C./1 hour post-cure within an oven to give a cured product whose hardness was measured with a durometer type A based on JIS K 6253-3: 2012 and whose tensile strength and elongation at break were measured based on JIS K6251: 2010. In addition, the dynamic coefficient of friction ($\mu'$) was measured under the conditions indicated below using the TSf-503 automatic friction abrasion analyzer from Kyowa Interface Science Co., Ltd., and the presence or absence of an oil film was checked by touch with the fingers. The results are show in Table 1.

[Dynamic Coefficient of Friction Measurement Conditions]

Measurement method: horizontal linear reciprocating sliding movement method

Contact: Steel ball

Load: 100 g

Velocity: 10 mm/s

Example 2

A silicone rubber mixture was obtained by adding 4.2 parts of dimethylpolysiloxane capped at both ends with trimethylsiloxy groups and having an average of 10 vinyl groups on side chains and an average degree of polymerization of 200 (E-1; viscosity, 700 mPa·s; alkenyl group content, 0.00065 mol/g), 1.65 parts of the methyl hydrogen/dimethylpolysiloxane (C-1) of Example 1 as a crosslinking agent and 0.10 part of 1,3,5,7-tetramethyl-1,3,5,7-tetravinylcyclotetrasiloxane as a reaction regulator to 100 parts of the inclusion complex (IC-1) of Example 1 and continuing to stir for 15 minutes.

The molar ratio of the total amount of Si—H groups to the amount of Si-vinyl groups (Si—H groups/vinyl groups) in this mixture was 1.3.

Next, 0.10 part of a dimethylsiloxane solution of 1,3-divinyl-1,1,3,3-tetramethyldisiloxane platinum complex (Pt concentration, 1 wt %) was mixed as component (D) into this silicone rubber mixture, giving a silicone rubber composition. The composition was subjected to a press-cure and post-cure in the same way as in Example 1, giving a cured product. The resulting cured product was measured and checked in the same way as in Example 1. The results are shown in Table 1.

Example 3

A silicone rubber mixture was obtained by adding 0.44 part of the methyl hydrogen/dimethylpolysiloxane of Example 1 as a crosslinking agent, 1.77 parts of a dimethylpolysiloxane capped at both ends with dimethylhydrogensiloxy groups and having no Si—H groups on side chains (C-2; average degree of polymerization, 20; Si—H group content, 0.0014 mol/g), and 0.10 part of 1,3,5,7-tetramethyl-1,3,5,7-tetravinylcyclotetrasiloxane as a reaction regulator to 100 parts of the inclusion complex (IC-1) of Example 1 and continuing to stir for 15 minutes.

The molar ratio of the total amount of Si—H groups to the amount of Si-vinyl groups (Si—H groups/vinyl groups) in this mixture was 1.3.

Next, 0.10 part of a dimethylsiloxane solution of 1,3-divinyl-1,1,3,3-tetramethyldisiloxane platinum complex (Pt concentration, 1 wt %) was mixed as component (D) into this silicone rubber mixture, giving a silicone rubber composition. The composition was subjected to a press-cure and post-cure in the same way as in Example 1, giving a cured product. The resulting cured product was measured and checked in the same way as in Example 1. The results are shown in Table 1.

Example 4

γ-Cyclodextrin (437 parts), 150 parts of water and 600 parts of the dimethylpolysiloxane in Example 1 (A-1) were mixed together at 25° C. for 20 minutes using a planetary mixer, following which the temperature was raised to 80° C. and the mixture was stirred for 20 minutes. Next, water was distilled off for 3 hours at 100° C. and under reduced pressure (1,200 Pa), giving an inclusion complex (IC-2) that was a uniform white paste. This inclusion complex (IC-2) had a degree of dispersion, when measured in the same way as in Example 1, that was ≤0 μm.

A silicone rubber mixture was obtained by adding 0.79 part of the methyl hydrogen/dimethylpolysiloxane in Example 1 as a crosslinking agent and 0.10 part of 1,3,5,7-tetramethyl-1,3,5,7-tetravinylcyclotetrasiloxane as a reaction regulator to 100 parts of the inclusion complex (IC-2) and continuing to stir for 15 minutes.

The molar ratio of the total amount of Si—H groups to the amount of Si-vinyl groups (Si—H groups/vinyl groups) in this mixture was 1.3.

Next, 0.10 part of a dimethylsiloxane solution of 1,3-divinyl-1,1,3,3-tetramethyldisiloxane platinum complex (Pt concentration, 1 wt %) was mixed as component (D) into this silicone rubber mixture, giving a silicone rubber composition. The composition was subjected to a press-cure and a post-cure in the same way as in Example 1, giving a cured product. The resulting cured product was measured and checked in the same way as in Example 1. The results are shown in Table 1.

Example 51

A silicone rubber mixture was obtained by adding 22.5 parts of the dimethylpolysiloxane of Example 1 (A-1), 0.88 part of the methyl hydrogen/dimethyl polysiloxane of Example 1 (C-1) as a crosslinking agent and 0.10 part of 1,3,5,7-tetramethyl-1,3,5,7-tetravinylcyclotetrasiloxane as a reaction regulator to 100 parts of the inclusion complex (IC-2) of Example 4 and continuing to stir for 15 minutes.

The molar ratio of the total amount of Si—H groups to the amount of Si-vinyl groups (Si—H groups/vinyl groups) in this mixture was 1.3.

Next, 0.10 part of a dimethylsiloxane solution of 1,3-divinyl-1,1,3,3-tetramethyldisiloxane platinum complex (Pt concentration, 1 wt %) was mixed as component (D) into this silicone rubber mixture, giving a silicone rubber composition. The composition was subjected to a press-cure and post-cure in the same way as in Example 1, giving a cured product. The resulting cured product was measured and checked in the same way as in Example 1. The results are shown in Table 1.

Example 6

γ-Cyclodextrin (291 parts), 100 parts of water and 600 parts of a dimethylpolysiloxane capped at both ends with dimethylvinylsiloxy groups and having an average degree of polymerization of 1,100 (A-2; viscosity, 100,000 mPa·s; alkenyl group content, 0.000025 mol/g) were mixed together at 25° C. for 20 minutes using a planetary mixer, following which the temperature was raised to 80° C. and the mixture was stirred for 20 minutes. Next, water was distilled off for 3 hours at 100° C. and under reduced pressure (1,200 Pa), giving an inclusion complex (IC-3) that was a uniform white paste. This inclusion complex (IC-3) had a degree of dispersion, measured in the same way as in Example 1, that was ≤0 μm.

A silicone rubber mixture was obtained by adding 0.64 part of the methyl hydrogen/dimethylpolysiloxane in Example 1 as a crosslinking agent and 0.10 part of 1,3,5,7-tetramethyl-1,3,5,7-tetravinylcyclotetrasiloxane as a reaction regulator to 100 parts of the inclusion complex (IC-3) and continuing to stir for 15 minutes.

The molar ratio of the total amount of Si—H groups to the amount of Si-vinyl groups (Si—H groups/vinyl groups) in this mixture was 1.3.

Next, 0.10 part of a dimethylsiloxane solution of 1,3-divinyl-1,1,3,3-tetramethyldisiloxane platinum complex (Pt concentration, 1 wt %) was mixed as component (D) into this silicone rubber mixture, giving a silicone rubber composition. The composition was subjected to a press-cure and a post-cure in the same way as in Example 1, giving a cured product. The resulting cured product was measured and checked in the same way as in Example 1. The results are shown in Table 1.

Comparative Example 1

A silicone rubber mixture was obtained by adding 1.18 parts of the methyl hydrogen/dimethylpolysiloxane of Example 1 (C-1) as a crosslinking agent and 0.10 part of 1,3,5,7-tetramethyl-1,3,5,7-tetravinylcyclotetrasiloxane as a reaction regulator to 100 parts of the dimethylpolysiloxane of Example 1 (A-1), and continuing to stir for 15 minutes.

The molar ratio of the total amount of Si—H groups to the amount of Si-vinyl groups (Si—H groups/vinyl groups) in this mixture was 1.3.

Next, 0.10 part of a dimethylsiloxane solution of 1,3-divinyl-1,1,3,3-tetramethyldisiloxane platinum complex (Pt concentration, 1 wt %) was mixed as component (D) into this silicone rubber mixture, giving a silicone rubber composition. The composition was subjected to a press-cure and a post-cure in the same way as in Example 1, giving a cured product. The resulting cured product was measured and checked in the same way as in Example 1. The results are shown in Table 1.

Comparative Example 21

α-Cyclodextrin (a compound in which six D-glucose units are joined by α-1,4 glycosidic bonds to form a cyclic structure, 291 parts), 100 parts of water and 600 parts of the dimethylpolysiloxane of Example 1 (A-1) were mixed together at 25° C. for 20 minutes using a planetary mixer, following which the temperature was raised to 80° C. and the mixture was stirred for 20 minutes. Next, water was distilled off for 3 hours at 100° C. and under reduced pressure (1,200 Pa). In this case, the resulting product was a non-uniform semi-transparent oil in which many granules were observable; an inclusion complex was not obtained. The product thus obtained had a degree of dispersion which, when measured in the same way as in Example 1, was ≥100 µm.

Comparative Example 3

γ-Cyclodextrin (600 parts), 200 parts of water and 600 parts of the dimethylpolysiloxane of Example 1 (A-1) were mixed together at 25° C. for 40 minutes using a planetary mixer, following which the temperature was raised to 80° C. and the mixture was stirred for 30 minutes. Next, the temperature was raised to 100° C. and drying was carried out under reduced pressure (1,200 Pa) for 4 hours, giving an inclusion complex that was a white paste (IC-4). This inclusion complex (IC-4) had a degree of dispersion which, when measured in the same way as in Example 1, was 0 µm. However, the viscosity of the inclusion complex that formed was too high, as a result of which further operations were impossible.

TABLE 1

|  | Example | | | | | | Comp. Ex. |
|---|---|---|---|---|---|---|---|
|  | 1 | 2 | 3 | 4 | 5 | 6 | 1 |
| Hardness: Durometer type A | 52 | 61 | 43 | 61 | 54 | 50 | 17 |
| Tensile strength, MPa | 2.6 | 3.6 | 1.8 | 3.1 | 3.3 | 2.4 | 0.4 |
| Elongation at break, % | 220 | 150 | 210 | 120 | 210 | 270 | 150 |
| Dynamic coefficient of friction (µ') | 0.22 | 0.17 | 0.23 | 0.15 | 0.23 | 0.23 | 0.82 |
| Oil film formation | no | no | no | no | no | no | no |

[Solvent Resistance]

The volume changes in the cured product obtained in Example 1 and the cured product obtained in Comparative Example 1 w % ben immersed for 70 hours at 25° C. in, respectively, water, ethanol, acetone, toluene and n-hexane were measured in accordance with JIS K6258. The results are shown in Table 2.

TABLE 2

|  | Water | Ethanol | Acetone | Toluene | n-Hexane |
|---|---|---|---|---|---|
| Example 1 | +3.4% | +11% | +29% | +147% | +156% |
| Comparative Example 1 | +0.3% | +17% | +38% | +316% | +469% |

The invention claimed is:

1. An addition-curable silicone rubber composition comprising:
   (A) 100 parts by weight of an organopolysiloxane which has at least two silicon-bonded alkenyl groups per molecule and in which an alkenyl group is bonded to a silicon atom at one or both ends of the molecular chain;
   (B) from 1 to 80 parts by weight of γ-cyclodextrin;
   (C) an organohydrogenpolysiloxane having at least two silicon-bonded hydrogen atoms per molecule, in an amount such that the molar ratio of the silicon-bonded hydrogen atoms (Si—H groups) to all silicon-bonded alkenyl groups in the overall composition, expressed as (Si—H groups/Si-alkenyl groups), is from 0.5 to 5.0; and
   (D) a catalytic amount of an addition reaction catalyst, wherein some or all of component (A) forms, together with component (B), an inclusion complex.

2. The addition-curable silicone rubber composition of claim 1, wherein component (A) is an organopolysiloxane in which the alkenyl groups are bonded only to silicon atoms at one or both ends of the molecular chain, and substituents bonded to silicon atoms other than at both ends of the molecular chain are all methyl groups.

3. The addition-curable silicone rubber composition of claim 1, wherein component (A) is an organopolysiloxane in which one end or both ends of the molecular chain are capped with dimethylalkenylsiloxy groups.

4. The addition-curable silicone rubber composition of claim 1, wherein component (A) is a linear organopolysiloxane.

5. The addition-curable silicone rubber composition of claim 1, wherein component (A) is an organopolysiloxane having a viscosity at 25° C., as measured by the method in JIS K 7117-1:1999, of from 5,000 to 200,000 mPa·s.

6. A method for producing the addition-curable silicone rubber composition of claim 1, which method comprises the steps of:
   (1) forming the inclusion complex of components (A) and (B) by mixing together component (B) and water and then adding and mixing component (A) into the resulting mixture;
   (2) adding and mixing component (C) into the inclusion complex; and
   (3) further adding and mixing in component (D).

7. The addition-curable silicone rubber composition of claim 1, wherein an average degree of polymerization of the organopolysiloxane (A) is not more than 2,000.

8. The addition-curable silicone rubber composition of claim 1, wherein an average degree of polymerization of the organopolysiloxane (A) is from 200 to 1,500.

* * * * *